United States Patent [19]
Ziegenbein et al.

[11] 4,425,413
[45] Jan. 10, 1984

[54] THERMAL INSULATION

[75] Inventors: Botho Ziegenbein, Neckarsteinach; Harald Reiss, Leimen, both of Fed. Rep. of Germany

[73] Assignee: Brown, Boveri & Cie AG, Mannheim, Fed. Rep. of Germany

[21] Appl. No.: 326,435

[22] Filed: Dec. 1, 1981

[30] Foreign Application Priority Data

Dec. 6, 1980 [DE] Fed. Rep. of Germany ....... 3046032

[51] Int. Cl.³ .................................. H01M 2/02
[52] U.S. Cl. .................................. 429/112; 429/104; 429/120; 220/422; 220/429
[58] Field of Search .................. 429/104, 112, 120; 220/422, 429, 445

[56] References Cited

U.S. PATENT DOCUMENTS

| | | | |
|---|---|---|---|
| 2,295,103 | 9/1942 | Friedly | 220/429 |
| 3,185,334 | 5/1965 | Omilian | 220/422 |
| 3,289,423 | 12/1966 | Berner et al. | 220/445 |
| 3,581,931 | 6/1971 | Yamamoto | 220/429 |
| 3,837,918 | 9/1974 | Nakabayashi | 429/120 |

*Primary Examiner*—Donald L. Walton
*Attorney, Agent, or Firm*—Herbert L. Lerner; Laurence A. Greenberg

[57] ABSTRACT

Thermal insulation, especially for high-temperature batteries, wherein the thermal insulation has at least one hermetically sealed cavity which contains insulating material, characterized by the feature that the cavity is evacuated and is completely filled with at least one very fine insulating material in powder form in such manner that at least one first region of the cavity can be loaded with full pressure over the area and at least one second region of the cavity has very low thermal conductivity, and that these two regions are arranged immediately adjacent to each other.

8 Claims, 6 Drawing Figures

THERMAL INSULATION

BACKGROUND OF THE INVENTION

1. Field of the Invention

The invention relates to thermal insulation, especially for high-temperature batteries, wherein the thermal insulation has at least one hermetically sealed cavity which contains insulating material.

2. Description of the Prior Art

Such thermal insulation finds use in preventing thermal losses of devices which are used in energy engineering. Among others, they are intended for high-temperature batteries such as batteries of the alkali metal and chalcogen type which are usually surrounded by thermal insulation in order to prevent the storage cells from cooling down, particularly in the operating intervals. Up to now, insulations used for such batteries are built, for instance, of glass or mineral wool. To obtain a sufficiently large effect, considerable wall thicknesses must be provided in these insulations, and specifically in those cases where the storage battery operates at elevated temperatures, for example at 350° C., and where these temperatures are to be maintained during the operating intervals of the battery, which may be hours. Since such thick-walled insulation increases the dimensions and/or the weight of the storage battery considerably, the energy storage density, i.e. the electric energy that can be stored per weight of volume unit, is small. This is a disadvantage, particularly for electrochemical batteries which are to be used as the power supply of electrically operated vehicles.

Another thermal insulation for such electrochemical storage cells is known. It is formed essentially by an evacuated cavity, within which metal foils are arranged. These metal foils are made particularly of aluminum and are arranged at a predeterminable distance from each other. The cavity is formed by metallic walls with a small thermal expansion coefficient. In order to prevent bending of the boundary walls (due to the existing vacuum) inward, bar-shaped supports between parallel boundary walls are arranged in the interior of the cavity. These support elements, however, cause a large heat flow from the inside of the insulation toward the outside. Thereby, the low thermal conductivity of the insulation which is obtained by the metallic foils, is largely lost again.

SUMMARY OF THE INVENTION

It is, therefore, an object of the invention to provide a thermal insulation which is light and thin-walled and the thermal conductivity of which at operating temperatures between 350° C. and the ambient temperature is less than $\lambda \leq 5 \cdot 10^{-3}$ W/(m.K). With this thermal insulation, bar-shaped support elements in the cavity of the insulation can be dispensed with completely.

With the foregoing and other objects in view, there is provided in accordance with the invention a thermal insulation comprising at least one hermetically sealed cavity bounded by walls and without rigid bracing members between walls, filled with at least one insulating material in powder form, said cavity having at least one first region in which the insulating material therein is more compact to resist inward bending of the boundary walls, and having at least one second region in which the insulating material is less compact than the insulating material of the first region to impart low thermal conductivity to the second region, said first and second regions being arranged immediately adjacent to each other.

Other features which are considered as characteristic for the invention are set forth in the appended claims.

Although the invention is illustrated and described herein as embodied in thermal insulation, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
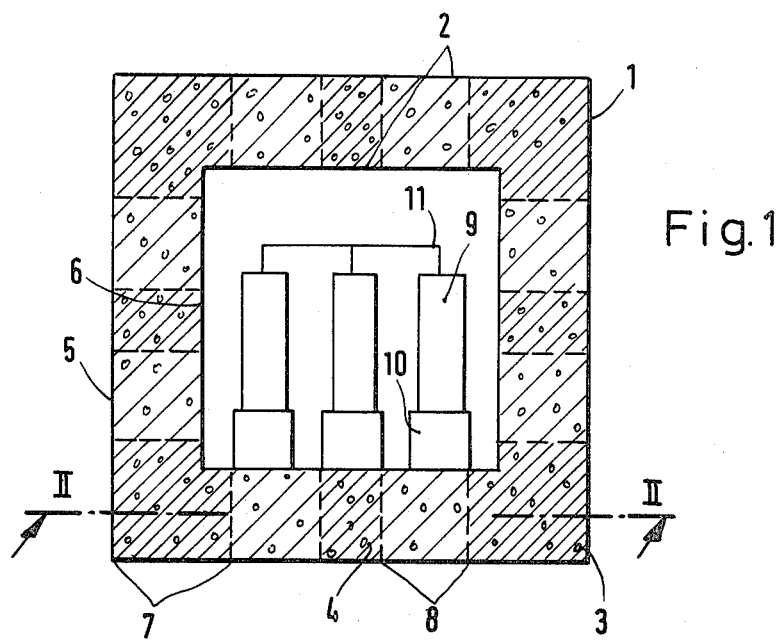
FIG. 1 shows a vertical section through a storage battery with surrounding thermal insulation, wherein the thermal insulation in the form of a sealed cavity containing insulation as compact sections and less dense sections of low thermal conductivity adjacent each other.

The cavity is evacuated and is completely filled with at least one very fine, powdered insulating material. At least a first region of the cavity can be loaded over an area with full pressure, i.e. introducing the insulating material under pressure as, for example, by means of presses to obtain a region of insulating material of desired compactness or density providing a support in the cavity and preventing the boundary wall from bending inward. At least a second region of the cavity has a very low thermal conductivity. These areas are arranged directly adjacent to each other.

Each boundary surface of the cavity has at least one surface area which can be loaded under full pressure. The areas of the cavity which can be loaded with the full pressure are filled with a compacted, very fine insulating material in powder form. Advantageously, this insulating material in powder form, having a density $\delta \leq 0.5$ g/cm³, is filled into the regions of the cavity which can be fully loaded with pressure. Through these measures, the insulation according to the invention forms a bracing for the boundary walls of the cavity, so that the latter cannot bend inward after the cavity is evacuated. These regions which can be loaded with the full pressure, ensure optimum support of the boundary walls, so that bar-shaped supports within the cavity can be dispensed with completely. Advantageously, the insulating material in powder form which is filled into the regions of the cavity which can be loaded with pressure, are doped with microfibers, which further increases the load-carrying capacity of these regions.

According to the invention, each boundary surface of the cavity has at least one region which has very low thermal conductivity and can be loaded under a lower pressure than the first region. Advantageously, these second regions are, likewise, filled with a very fine insulating material in powder form. The powdered insulating material filled into these regions may also be doped with micro-fibers. The insulating material in powder form is filled into the regions which have very low thermal conductivity with a density of 0.35 g/cm$^3$. A ceramic powder is preferably used for filling the regions that can be loaded with full pressure and the regions which have a very low thermal conductivity. Especially suited for this purpose are $SiO_2$, $Al_2O_3$, $CaSiO_4$ and $MgO$. To enhance radiation extinction, titanium oxide can be mixed with this ceramic insulating powder.

The cavity forming the thermal insulation has metallic boundary walls which are preferably made of a ferrous alloy with nickel or chromium. In one embodiment of the invention, the cavity is bounded by two rectangular hollow bodies having different dimensions. The smaller hollow body is arranged within the larger one, and the space remaining between the two hollow bodies forms the cavity of the insulation.

It is a particular advantage of this invention that no bar-shaped braces are necessary within the cavity between parallel boundary walls. Thereby, no spot stresses of the metallic boundary walls of the cavity are developed, and also no reduction of the heat insulation due to increased heat conduction by the braces from the inside to the outside is present. The evacuated cavity forming the insulation prevents or makes more difficult a heat flow from the interior of the electrochemical storage battery to the outside space by convection. If powdered insulating material is used, the radiation conduction and solid-body conduction is reduced considerably. If, in addition, an optical clouding agent is admixed to the powdered insulating material, the radiation extinction is increased thereby, because therewith, the $T^3$-dependence of the radiation conductivity can be reduced. The thermal conductivity of the thermal insulation according to the invention is approximately 10-times smaller than a thermal insulation with glass wool of the same thickness. Advantageously, the cavity forming the insulation has a very low residual gas pressure. If compressed, powdered insulation material is used or if powdered insulating material doped with micro-fibers is used for forming the regions within the cavity which can be loaded with pressure, an optimum support of the metallic boundary walls is ensured.

Further advantages of the invention will be seen from the following description of the embodiment examples in conjunction with the schematic drawings.

FIG. 1 shows the thermal insulation 1 according to the invention which is arranged around an electric storage battery. The thermal insulation 1 is formed in the embodiment example shown here by a gas-tight cavity 2, which is completely filled with an insulating material 3. The hermetically sealed cavity 2 is formed in the embodiment example described here by two rectangular (prismatic) hollow metallic bodies 5 and 6. These have different dimensions, the smaller body 5 being arranged within the larger body 6. The dimensions of these two hollow bodies 5 and 6 are chosen so that the cavity 2 between them has the dimensions which the thermal insulation 1 should have. The boundary surfaces of the bodies 5 and 6 are made of a ferrous alloy with nickel and chromium. The metallic boundary surfaces of each body 5 and 6 are joined together gas-tight, preferably by welding. Thereby, the cavity between the two bodies 5 and 6 is, likewise, sealed gas-tight. Before the cavity 2 is finally sealed gas-tight, it is filled with the ceramic powder 3 mentioned above. According to the invention, the cavity 2 which contains the thermal insulation 1 has regions 7 which can be loaded with full pressure as well as regions 8 which have a very low thermal conductivity. The thermal conductivity $\lambda$ of the regions 7 which can be loaded with full pressure, may be between $10^{-2}$ and $2\times10^{-2}$ W/(m.K) while the thermal conductivity $\lambda$ of the regions 8 has values between $10^{-3}$ and $8\times10^{-3}$ W/(m.K). The regions 8 can also be loaded, but with a substantially smaller force per area than the regions 7.

As can be seen in FIG. 1, the regions 8 are of cylindrical shape and are arranged like islands between the regions 7. In the example shown here, the insulating material filled into the regions 7 consists of a very fine powder which is doped with micro-fibers. For this purpose, glass fibers or ceramic fibers may be utilized. These can be compressed to a certain degree in order to increase the pressure-carrying capacity. The powdered insulating material is filled with a density of $\delta \leq 0.5$ g/cm$^3$ into the regions 7 of the cavity 2. The regions 8 of the cavity 2 are, likewise, filled with powder insulating material 3 which may also be doped with micro-fibers 4. This powder is filled into the regions 8 of the cavity with a density of $\delta \leq 0.35$ g/cm$^3$.

Figure 2:
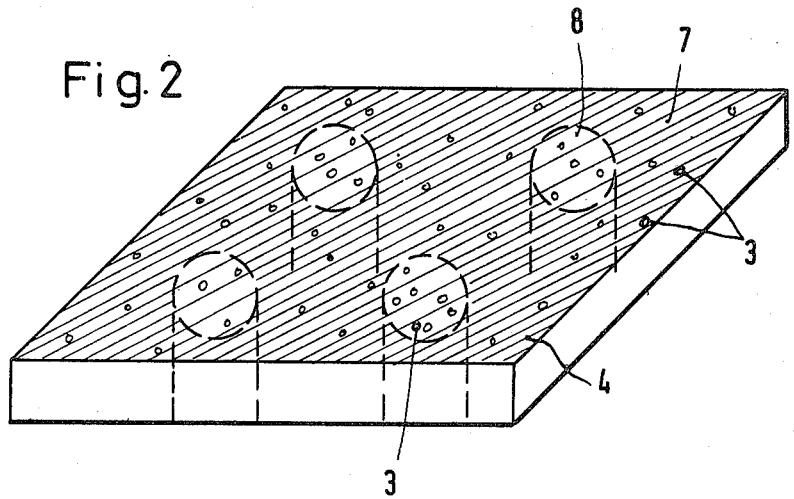
FIG. 2 is a horizontal section through the insulation of the storage battery taken along line II—II of FIG. 1.

FIG. 2 shows a horizontal section through the electrochemical storage battery shown in FIG. 1 along the line II—II. It can be seen from this drawing that the regions 8, as already mentioned above, are arranged, in island-fashion between the regions 7 which can be loaded with full pressure. In the example shown here, the regions 8 are arranged in cylindrical recesses which are provided within the regions 7 which can be loaded with pressure. The insulating material 3 filling the regions 7 is immediately adjacent to the insulating material 3 which is in the regions 8. As can be seen from FIG. 1, the interior of the hollow body 5 serves as the space for the electrochemical storage cells 9 which form the storage battery. The number of storage cells used depends on the desired size of the storage battery. The dimensions of the two hollow bodies 5 and 6 forming the thermal insulation 1 is matched correspondingly to the desired size of this battery. The storage cells 9 of the sodium and chalcogen type are shown schematically in the embodiment example shown in FIG. 1. They are supported on an inner boundary wall of the hollow body 5 with the interposition of electrically conducting structure elements 10. Here, the elements 10 serve for the electrical connection of the outer casings of the storage cells 9 which form one electrical pole of the storage cells 9. The second electrical poles of the storage cells 9 which are located at their upper ends, are connected together via an electric line 11. The latter is brought to the outside electrically insulated (not shown). In order to ensure the pressure-carrying capacity of the regions 7, the powder is filled into the regions 7 with a substantially higher density than into the regions 8. This can be achieved in particular by pushing the powder into the regions 7 of the cavity by means of presses. According to the invention it is entirely possible to fill the regions 7 and 8 of the cavity with the same insulating material 3. The only difference between the insulating materials 3 consists in the different density with which they are filled into the cavity 2. As a further possibility, if insulating material in powder form is used, an optical clouding agent may be admixed therewith. Titanium oxide in powder form, for instance, is suitable for this purpose. Through this measure, the radiation extinction is increased, whereby the $T^3$-dependence of the radiation conductivity can be reduced.

After the cavity 2 is completely filled with the insulating materials described above, the former is evacuated sufficiently and subsequently sealed gas-tight. It is, furthermore, possible to fill the two regions 7 and 8 exclusively with an insulating material which is formed by micro-fibers. These micro-fibers must then be filled into the regions 7 and 8 with their respective densities.

Figure 3:
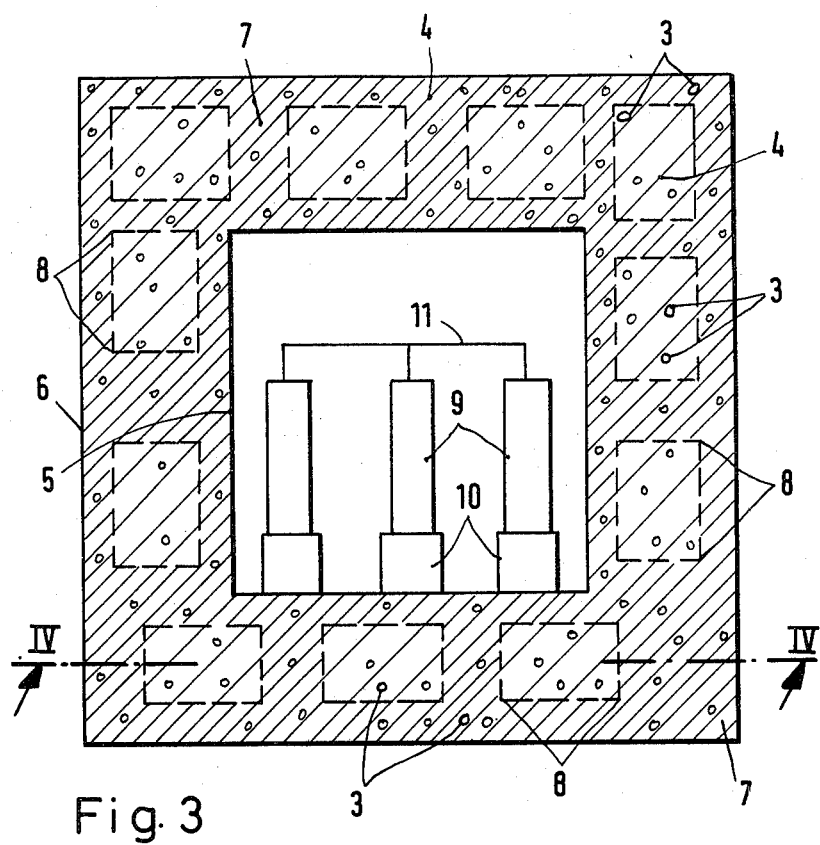
FIG. 3 is a further embodiment of a storage battery with thermal insulation, similar to FIG. 1, differing principally in the disposition and arrangement of the less dense sections relative to the more compact sections.

FIG. 3 shows a further embodiment of the thermal insulation 1 according to the invention which is again arranged around an electrochemical storage battery. The hollow space 2 of the thermal insulation 1 is bounded also in this embodiment, as shown in FIG. 1 and explained in the corresponding description, by two hollow bodies 5 and 6. The two hollow bodies 5 and 6 are made of the same material as in the embodiment example shown in FIG. 1. By suitable choice of its dimensions, the size of the cavity 2 between them can be matched to the desired size also in this embodiment example.

In the interior of the hollow body 5, electrochemical storage cells 9 are arranged which form the storage battery. The arrangement and the electrical interconnection of these storage cells are accomplished here in the same manner as in the embodiment example shown in FIG. 1 and explained in the corresponding description.

Also in this embodiment example, the cavity 2 forming the thermal insulation 1 is provided with regions 7 which can be loaded with full pressure as well as regions 8 which can be loaded with less pressure, and which have a very low thermal conductivity λ. As can be seen from FIG. 3, the regions 8 are arranged here between the regions 7 which can be loaded with pressure. In particular, the regions 8 are arranged so that they are not brought continuously from the inner boundary of the insulation to the outer boundary. Rather, insulating material 3 which can be pressure-loaded, is arranged between the outer boundary of the insulation 1 and the regions 8. Between the regions 8 and the inner boundary of the insulation, material that can be pressure-loaded is likewise arranged.

Figure 4:
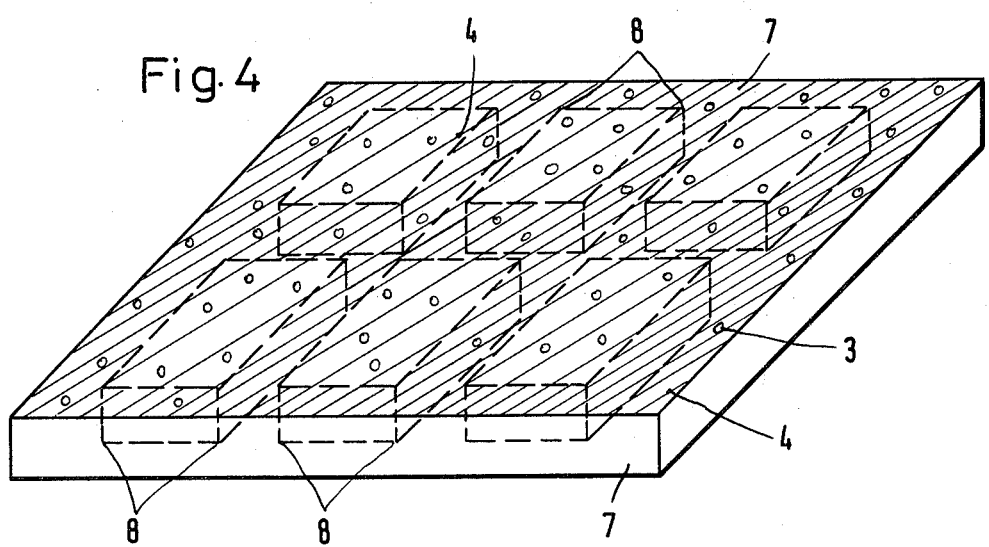
FIG. 4 is a horizontal section through the insulation of the storage battery taken along line IV—IV of FIG. 3.

FIG. 4 shows a section through the storage battery taken along line IV—IV. It can be seen from this figure that the regions 8 have the form of slabs, the longitudinal axis of these slabs being arranged perpendicularly to the temperature gradients. The regions 7 which can be pressure-loaded are filled here with a fine powdered insulating material 3 which is doped with micro-fibers 4. In particular, ceramic powder 3 is used here which, for instance, is doped with glass fibers 4. Also if doped with fibers, the powder 3 for filling the regions 7 must be pressed to a certain extent so that the required pressure load capacity is provided. This ensures that the metallic boundary walls of the cavities 2 do not bend inward due to the vacuum prevailing in its interior. For obtaining a very low thermal conductivity in the regions 8, the latter are filled with an insulating material in powder form. The additional admixture of optical clouding agents, particularly by titanium oxide, to the powdered insulating material may be effected without difficulty and, indeed is desirable.

The cavity forming the thermal insulation is evacuated also in this embodiment example after it is filled with the insulating materials 3, 4 and is subsequently sealed gas-tight.

Figure 5:
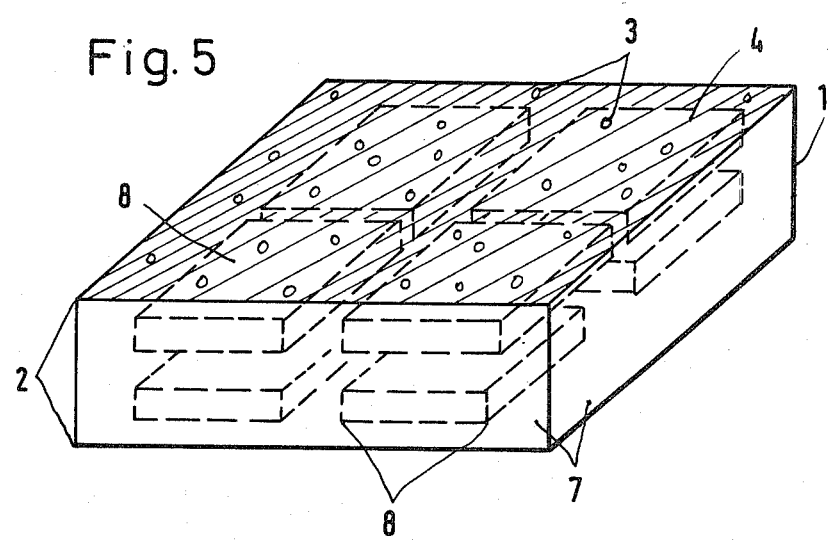
FIG. 5, while similar to FIG. 4 shows another arrangement of the insulating material within the cavity in that the less dense sections in the form of slabs are arranged in two planes.

FIG. 5 shows another embodiment of the thermal insulation. Only the part of the cavity 2 which forms the bottom of the storage battery is shown here for explanation. The other parts of the cavity 2 are designed in a similar manner. The cavity has regions 7 which can be loaded over the area with full pressure, as well as regions 8 with a small load-carrying capacity and very low thermal conductivity. The regions 8 are surrounded by the regions 7. Such regions 8 are arranged in two planes. The regions 8 have the form of slabs. The regions 8 arranged in each plane are surrounded by regions 7 which can be pressure-loaded. Similarly, the regions 8 which are arranged in the two planes, are separated by insulating material 3 which can be pressure-loaded. The longitudinal axes of the slab-like regions 8 are arranged perpendicularly to the temperature gradients. Material which can be pressure-loaded is likewise arranged between the inner and the outer boundary of the cavity 2 and the regions 8. For filling the regions 7 and 8, the above-mentioned insulating materials can also be used here, in particular, the powder which are additionally doped with micro-fibers and are mixed with infrared-optical clouding agents.

Figure 6:
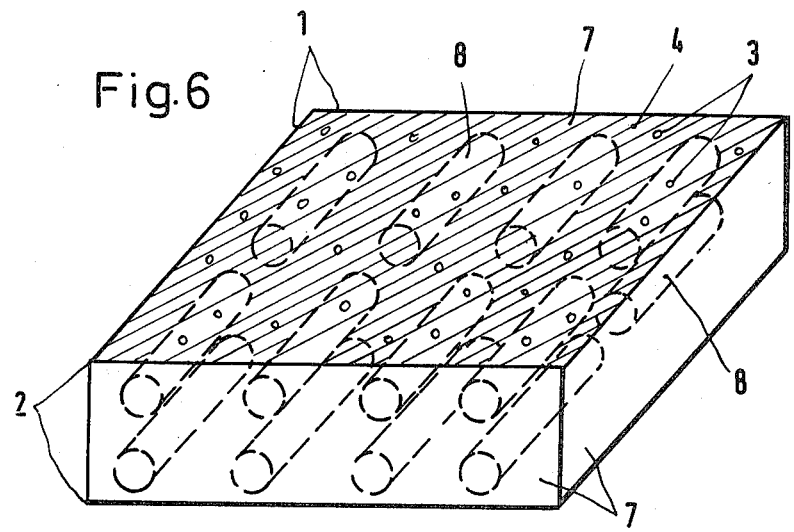
FIG. 6 is a variant of the insulation shown in FIG. 5, in that the less dense sections are in the form of cylinders.

In FIG. 6, the region of the cavity 2 forming the bottom of the storage battery is likewise shown. In this embodiment, regions 8 which can be loaded with less pressure and are of cylindrical shape are arranged between the insulating material which can be fully pressure-loaded; again, the regions 8 have very low thermal conductivity. The longitudinal axes of these cylindrical regions 8 are arranged perpendicularly to the orientation of the temperature gradients. The arrangement of the insulating material which can be loaded with the full pressure is here similar to that in the embodiment example which is shown in FIG. 5 and explained in the corresponding description. The thermal insulation for electrochemical batteries in accordance with the invention described here is not limited to the embodiment examples described. In particular, it also includes other arrangements and designs of regions 7 which can be loaded with full pressure and regions 8 which have very low thermal conductivity.

We claim:

1. Thermal insulation comprising at least one hermetically sealed cavity bounded by walls and without rigid bracing members between walls, filled with at least one insulating material in powder form said cavity having at least one first region in which the insulating material therein is more compact to resist inward and outward bending and pressures of an against the boundary walls, and having at least one second region in which the insulating material is less compact than the insulating material of the first region to impart low thermal conductivity to the second region, said first and second regions of the cavity are filled with very fine ceramic powder which is doped with microfibers, with the ceramic powder filled into the first region having a density of $\delta \leq 0.5$ g/cm$^3$ and the ceramic powder in the second region having a density of $\delta \leq 0.35$ g/cm$^3$ and said first and second regions being arranged immediately adjacent to each other.

2. Thermal insulation according to claim 1, wherein the insulating material in powder form is selected from the group consisting of $SiO_2$, $Al_2O_3$, $ZrO_2$, $CaSiO_4$ and MgO.

3. Thermal insulation according to claim 1, wherein the insulating material in powder form is admixed with a powder infrared-optical clouding agent.

4. Thermal insulation according to claim 3, wherein titanium oxide is the infrared-optical clouding agent.

5. Thermal insulation according to claim 1, wherein the boundary walls of the cavity are metallic.

6. Thermal insulation according to claim 5, wherein the metallic boundary walls of the cavity are made of a ferrous alloy with nickel or chromium.

7. Thermal insulation according to claim 1, wherein the cavity is defined by two rectangular hollow bodies having different dimensions, and wherein the smaller hollow body is arranged within the larger hollow body.

8. Thermal insulation according to claim 1, wherein said insulation surrounds high-temperature batteries of the alkali metal and chalcogen type.

* * * * *